United States Patent
Adam

(10) Patent No.: US 9,626,112 B2
(45) Date of Patent: Apr. 18, 2017

(54) EMMC FUNCTIONALITY EXPANDER

(71) Applicant: SYMBOL TECHNOLOGIES, INC., Lincolnshire, IL (US)

(72) Inventor: Mihai Adam, Farmingville, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 58 days.

(21) Appl. No.: 14/562,803

(22) Filed: Dec. 8, 2014

(65) Prior Publication Data

US 2016/0162201 A1    Jun. 9, 2016

(51) Int. Cl.

| | | |
|---|---|---|
| G06F 12/00 | (2006.01) |
| G06F 3/06 | (2006.01) |
| G06F 12/02 | (2006.01) |
| G06F 12/0868 | (2016.01) |
| G06F 13/38 | (2006.01) |
| G06F 13/00 | (2006.01) |
| G06F 13/28 | (2006.01) |

(52) U.S. Cl.
CPC .......... *G06F 3/0613* (2013.01); *G06F 3/0655* (2013.01); *G06F 3/0679* (2013.01); *G06F 12/0246* (2013.01); *G06F 12/0868* (2013.01); *G06F 13/385* (2013.01); *G06F 2212/1032* (2013.01); *G06F 2212/222* (2013.01); *G06F 2212/7203* (2013.01)

(58) Field of Classification Search
CPC .......... G06F 2212/7203; G06F 3/0613; G06F 3/0655; G06F 3/0679; G06F 12/0246
See application file for complete search history.

(56) References Cited

U.S. PATENT DOCUMENTS

| | | | |
|---|---|---|---|
| 5,987,573 A * | 11/1999 | Hiraka | ................ G06F 12/0246 |
| | | | 711/156 |
| 7,610,445 B1 | 10/2009 | Manus et al. | |
| 8,301,824 B2 | 10/2012 | Duzly et al. | |
| 8,307,143 B2 | 11/2012 | Hirayama et al. | |

(Continued)

FOREIGN PATENT DOCUMENTS

EP         1615135 B1       2/2013

OTHER PUBLICATIONS

International Search Report and Written Opinion for corresponding International Patent Application No. PCT/US2015/064217 mailed on Apr. 12, 2016.

*Primary Examiner* — Mark Giardino, Jr.

(57) ABSTRACT

An eMMC functionality expander, and methods there for, are provided herein. For example, provided herein is a device comprising: a first processor; a multimedia card memory ("eMMC"); a second processor; a client eMMC interface between the second processor and the first processor; a host eMMC interface between the second processor and the eMMC; and an NVRAM ("Non-Volatile Random Access Memory") in communication with the second processor, the second processor configured to manage data storage to the eMMC and the NVRAM so that the eMMC and the NVRAM appears as a single storage device to the first processor. The NVRAM can also be used to provide communication between the first processor and a slave processor. Furthermore, the NVRAM can store boot data, and the like, to decrease the boot times of the processors and the boot time of the device.

16 Claims, 12 Drawing Sheets

(56) References Cited

U.S. PATENT DOCUMENTS

| | | | |
|---|---|---|---|
| 8,447,922 B2* | 5/2013 | Nakanishi | G06F 12/0246 |
| | | | 711/103 |
| 8,782,336 B2 | 7/2014 | Sutardja et al. | |
| 2007/0038808 A1 | 2/2007 | Yim et al. | |
| 2008/0195797 A1 | 8/2008 | Sherman et al. | |
| 2009/0204744 A1 | 8/2009 | Chou et al. | |
| 2011/0055490 A1 | 3/2011 | Gentric et al. | |
| 2011/0113184 A1* | 5/2011 | Chu | G06F 1/30 |
| | | | 711/103 |
| 2012/0023298 A1* | 1/2012 | Duzly | G06F 12/0615 |
| | | | 711/154 |
| 2012/0297147 A1* | 11/2012 | Mylly | G06F 12/0246 |
| | | | 711/143 |
| 2014/0108703 A1 | 4/2014 | Cohen et al. | |

* cited by examiner

EMMC FUNCTIONALITY EXPANDER

BACKGROUND OF THE INVENTION

Embedded Multimedia Card memories ("eMMC") are increasingly ubiquitous in devices, and especially portable devices. Specifically, eMMC devices are increasingly being used as primary boot and/or memory devices due to their robust and portable nature, as compared to hard drive devices with their moving parts and size being difficult to incorporate into increasingly thin and small portable devices. However, the MultiLevelCell Nand Flash eMMCs have a limited write capability, failing after as few as 3000 block write/erase cycles thereto. To address this, the life of an eMMC can be extended by utilizing it in an enhanced mode, with only half of the storage capacity of the eMMC device, for example by partitioning the eMMC in pseudo-SLC ("single-level cell") mode. In other words, a processor accessing the eMMC has access to only half the storage capacity of the eMMC and considering the cost of an eMMC, this can be an expensive alternative. Furthermore, current application processors used in mobile devices generally have high speed interfaces pre-assigned for certain functionality; and/or if they have a general purpose unassigned interface, one is generally of a same host type and it can be very difficult to interconnect two mobile Application processors through a high throughput digital interconnect.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
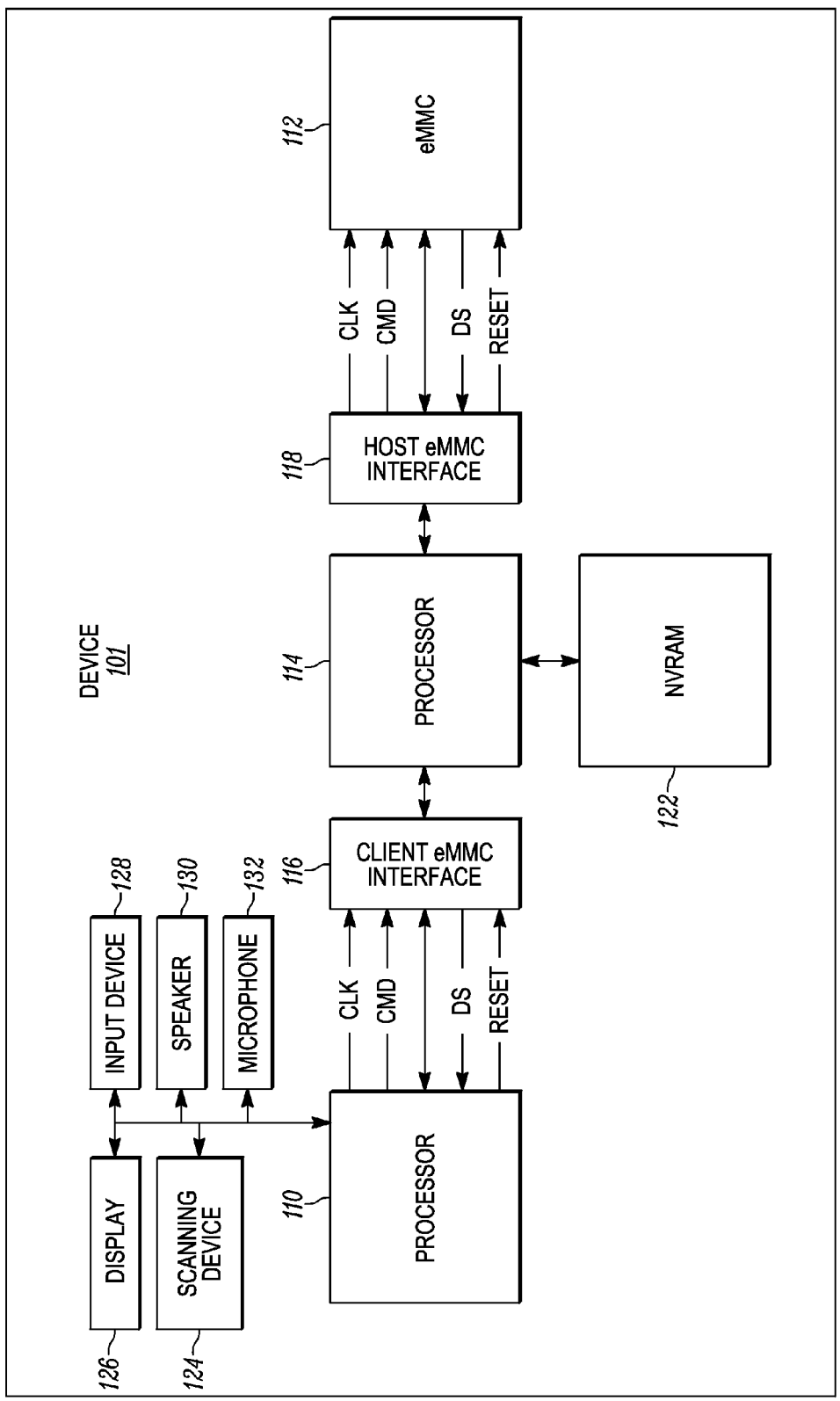
FIG. 1 is a block diagram of a device with enhanced eMMC functionality, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a first processor; a multimedia card memory ("eMMC"); a second processor; a client eMMC interface between the second processor and the first processor; a host eMMC interface between the second processor and the eMMC; and an NVRAM ("Non-Volatile Random Access Memory") in communication with the second processor, the second processor configured to manage data storage to the eMMC and the NVRAM so that the eMMC and the NVRAM appears as a single storage device to the first processor. For example, the second processor can be further configured to: receive data from the first processor for storage at the eMMC via the client eMMC interface; and, at least temporarily store the data at the NVRAM.

FIG. 1 is a block diagram of a device 101 comprising: a first processor 110; a multimedia card memory ("eMMC") 112; a second processor 114; a client eMMC interface 116 between second processor 114 and first processor 110; a host eMMC interface 118 between second processor 114 and eMMC 112; and an NVRAM ("Non-Volatile Random Access Memory") 110 in communication with second processor 114, second processor 114 configured to manage data storage to eMMC 112 and NVRAM 122 so that eMMC 112 and NVRAM 122 appears as a single storage device to first processor 110. For example, as will be describe in more detail below, second processor 114 can be further configured to: receive data from first processor 110 for storage at eMMC 112 via client eMMC interface 116; and, at least temporarily store the data at NVRAM 122.

Device 101 can be any type of electronic device that can be used in a self-contained manner, for example, to gather data. Device 101 can hence include, but is not limited to, any suitable combination of electronic devices, data gathering devices, laptop computers, portable electronic devices, mobile computing devices, portable computing devices, tablet computing devices, laptop computing devices, and the like. Other suitable devices are within the scope of present implementations. However, It should be emphasized that the structure of device 101 in FIG. 1 is purely an example, and contemplates a device that can be used for scanning and/or gathering data, but that other devices are within the scope of present implementations, for example others devices that can be used for specialized functions, including, but not limited, to one or more of, telephony, computing, and the like.

With reference to FIG. 1, device 101 can further comprise, but is not limited to, at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Device 101 can further comprise, but is not limited to, a scanning device 124 which can be used to gather data. For example, scanning device 124 can include, but is not limited, a laser scanning device, a barcode scanner, an optical scanner and the like.

Device 101 can further include, but is not limited to, a display 126, a speaker 130, and a microphone 132. While not depicted, device 101 can further include a power supply. While also not depicted, device 101 can further include a communication interface configured to exchange data and/or receive data from a network. Depending on the implementation of the embodiment, the display 126 can be realized as a liquid crystal display (LCD), a touch-sensitive display, a cathode ray tube (CRT), a light emitting diode (LED) display, an organic light emitting diode (OLED) display, a plasma display, a projection display, or another suitable electronic display. Depending on the implementation, speaker 130 and microphone 132 can comprise a telephone speaker/microphone, stereo speakers, recording microphones, and the like.

Processor 110 runs or executes operating instructions and/or programs, which are stored in one or more of eMMC 112 and NVRAM 122, to perform various functions for the device 101 and to process data. Hence, processor 110 can include, but is not limited to, a host application processor. Processors 110, 114 each includes one or more microprocessors, microcontrollers, digital signal processors (DSP), state machines, logic circuitry, and/o or any device or devices that process information based on operational or programming instructions stored in eMMC 112 and/or NVRAM 122. In particular, each of processors 110, 114 comprise a respective hardware processor. As will be described hereafter, processor 114 acts as an intermediary between processor 110 and the combination of eMMC 112 and NVRAM 122, via client eMMC interface 116 and host eMMC interface 118, for example to provide virtualized memory. In accordance with present implementations, processor 114 processes various functions and data associated with managing data storage to eMMC 112 and NVRAM 122 so that eMMC 112 and NVRAM 122 appears as a single storage device, and/or as a virtualized memory, to processor 110.

eMMC 112 comprises an embedded eMMC ("eMMC"). However, techniques described herein can also be applied to a removable MMC. Hence, when eMMC 112 is replaced by a removable MMC, device 101 further comprises a port for removably receiving the removable MMC.

In general, eMMC 112 can comprises a flash memory; in particular eMMC 112 can comprise a managed Nand Flash memory that is formatted and/or built and/or manufactured according to a JEDEC (Joint Electron Device Engineering Council) standard including, but not limited to, any of Revisions. 4.4. to 5.1, as well as any other JEDEC standards later developed. While not depicted eMMC 112 can include a controller and one or more raw Nand storage devices; through the controller, eMMC 112 can hide the complexity of managing Nand storage devices by exposing to a host processor a standard client eMMC interface. At logical level, eMMC 112 can use 48 bit command packets and 512 byte data packets. However, other eMMC devices are within the scope of present implementations.

NVRAM 122 can comprise one or more of: a Magnetic RAM ("MRAM", a Phase Change RAM ("PCM") and a resistive RAM ("ReRAM"). Indeed, such devices are an evolving class of data storage devices with new types of NVRAM being developed yearly. However, in general, NVRAM 122 comprises a solid state non-volatile memory that store data whether powered or not powered; further NVRAM 122 is lacking moving parts, unlike a hard drive non-volatile memory. In other words, this new class of Non-Volatile Memory Devices like PCM, MRAM and ReRAM can be used to enhance the capabilities of eMMC devices, and/or can provide an eMMC-like device and/or a virtual eMMC, as described herein.

Client eMMC interface 116 and host eMMC interface 118 each comprise a respective interface between processor 110 and eMMC 112. For example, without processor 114, client eMMC interface 116 and host eMMC interface 118 would act as the normal interfaces between processor 110 and eMMC 112. However, as processor 114 acts as an intermediary between processor 110 and eMMC 112, client eMMC interface 116 comprises an interface between processor 110 and processor 114, such that processor 110 communicates with processor 114 as if communicating with eMMC 112. Similarly, host eMMC interface 118 comprises an interface between eMMC 112 and processor 114, such that eMMC 112 communicates with processor 114 as if communicating with processor 110. In other words, processor 110 and eMMC 112 behave as if they are communicating with each other when they are actually each communicating with processor 114.

Furthermore, client eMMC interface 116 and host eMMC interface 118 can comprise a data interface that includes a serial data bus, or a parallel data bus and the like. Furthermore, communication at each of client eMMC interface 116 and host eMMC interface 118 is generally bidirectional so that processors 110, 114 can communicate with each other bidirectionally, and so that processor 114 and eMMC 112 can communicate with each other bidirectionally. In particular non-limiting implementations, each of client eMMC interface 116 and host eMMC interface 118 can comprise a 4 bit data bus or an 8 bit data bus (both bidirectional), for example as described in JEDEC Standard 5.0. which provides high data throughput between processors 110, 114 and eMMC 112.

As depicted, each of client eMMC interface 116 and host eMMC interface 118 uses an eMMC based format and/or standard to exchange data, including exchange of "clk", "cmd", "ds" and "Reset" commands; for example, client eMMC interface 116 can receive one or more of such commands using client eMMC interface 116, and relay them to eMMC 112 using host eMMC interface 118, and vice versa. While arrows showing specific flow of commands are depicted in FIG. 1, it is appreciated that data commands can be based in both directions (i.e. between processor 110 and client eMMC interface 116, and between eMMC 112 and host eMMC interface 118). Further, each of client eMMC interface 116 and host eMMC interface 118 can be based on other interface types including, but not limited to SD (secure digital) interfaces and SDIO (secure digital input out) interfaces.

In some implementations, processor 114, client eMMC interface 116 and host eMMC interface 118 can be implemented as a hardware module within device 101 including, but not limited to, a field programmable gate array ("FPGA"), and the like. In some implementations, NVRAM 122 can be integrated with the hardware module, while in other implementations, NVRAM 122 can be separate from the hardware module.

In any event, it should be understood that a wide variety of configurations for device 101 are contemplated.

Figure 2:
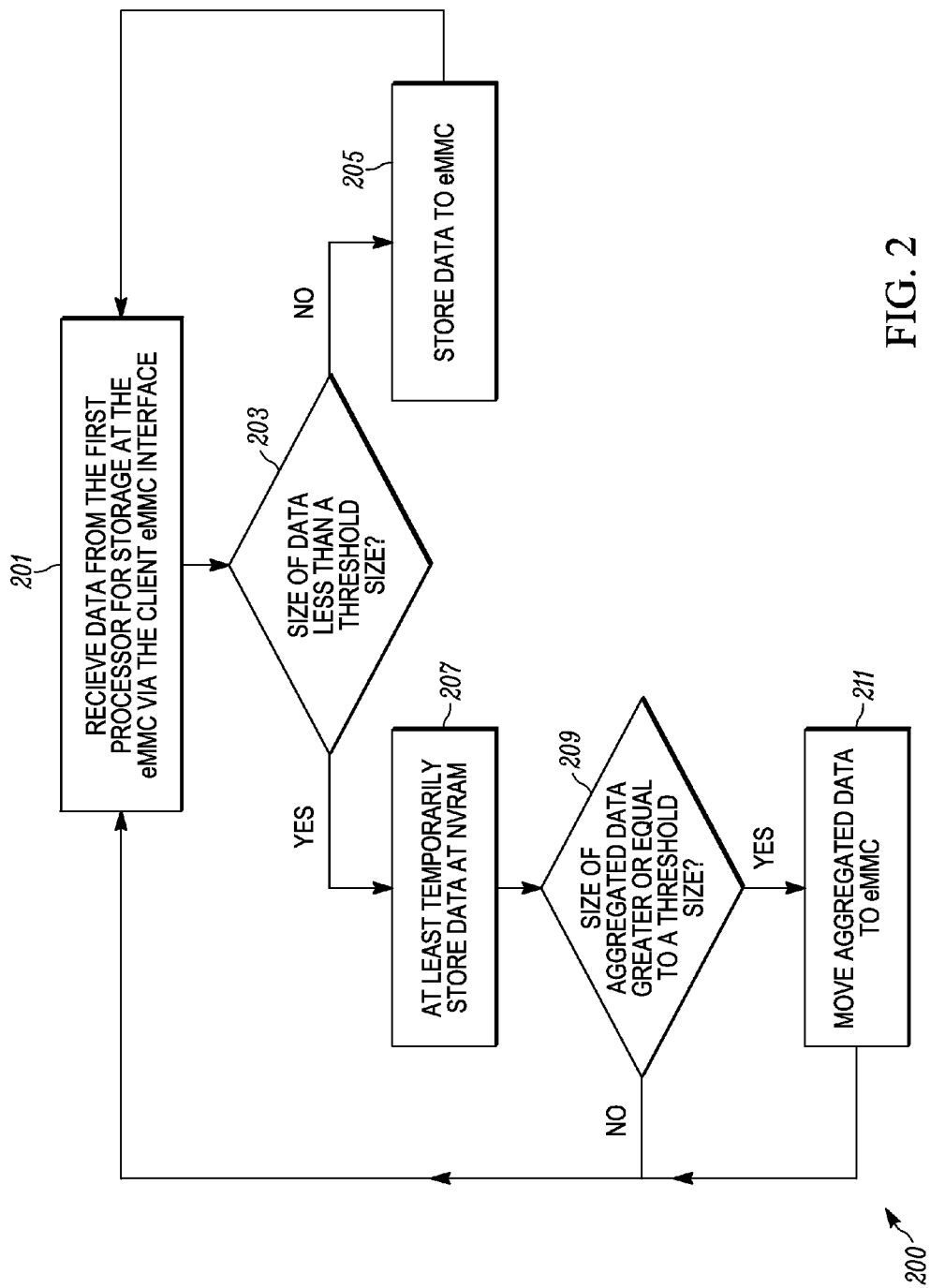
FIG. 2 is a flowchart of a method for managing data storage, in accordance with some embodiments.

Attention is now directed to FIG. 2 which depicts a flowchart of a method 200 for managing data storage, according to non-limiting implementations. In order to assist in the explanation of method 200, it will be assumed that method 200 is performed using device 101, and specifically by processor 114 of device 101. Indeed, method 200 is one way in which device 101 can be configured. Furthermore, the following discussion of method 200 will lead to a further understanding of device 101, and its various components. However, it is to be understood that device 101 and/or method 200 can be varied, and need not work exactly as discussed herein in conjunction with each other, and that such variations are within the scope of present implementations.

Regardless, it is to be emphasized, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well.

At block 201, processor 114 receives data from processor 110 for storage at eMMC 112 via client eMMC interface 116.

At block 203, processor 114 determines whether a size of the data is below a threshold size. When the size of the data is greater than, or equal, to the threshold size (a "YES" decision at block 203), at block 205 processor 114 stores the data to eMMC 112, and processor 114 awaits receipt of further data at block 201.

However, when the size of the data is less than the threshold size (a "NO" decision at block 203), at block 207 processor 114 stores the data to NVRAM 122, and further aggregates the data with other data stored at NVRAM 122 that had previously been received at processor 114 (e.g. from processor 110) for storage at eMMC 112. In other words, at blocks 201 to 207, rather than store received data at eMMC 112, processor 114 stores, and aggregates, the received data at NVRAM 122.

At block 209, processor 114 determines whether a size of aggregated data is greater than or equal to the threshold size. When the size of the aggregated data is not greater than, or equal to, the threshold size (a "No" decision at block 209), processor 114 awaits receipt of further data at block 201. Otherwise, when the size of the aggregated data is greater than, or equal to, the threshold size (a "YES" decision at block 203), at block 211 processor 114 moves the aggregated data to eMMC 112, and processor 114 awaits receipt of further data at block 201.

Hence, according to blocks 201 to 211, processor 114 can be configured to receive data from processor 110 for storage at eMMC 112 via client eMMC interface 116; and, at least temporarily store the data at NVRAM 122. Alternatively, according to block 201 to 211, processor 114 can be configured to: aggregate data received from processor 110, via client eMMC interface 116, for storage at eMMC 112, at NVRAM 122, when a size of the data is below a threshold size; and, when aggregated data is above the threshold size, move the aggregated data to eMMC 112. For example, the threshold size can be about a Nand page size, though other threshold sizes are within the scope of present implementations, including, but not limited to, a maximum page-write size associated with eMMC 112.

Hence, by implementing method 200 at processor 114 can reduce the number of write cycles to eMMC 112, by preventing writes that are smaller than Nand page size, and aggregating data for storage at NVRAM 122 until the aggregated data reaches a Nand page size.

The threshold size, and/or programming instructions for method 200, can be stored at one or more of eMMC 112 and NVRAM 122, and retrieved by processor 114 prior to implementation of method 200. Storage of threshold size, and/or programming instructions for method 200 at one or more of eMMC 112 and NVRAM 122 can occur in a provisioning process. For example, programming instructions for method 200 can be incorporated into operating system boot data and stored at one or more of eMMC 112 and NVRAM 122, and retrieved during a boot of device 101. However, storage of such operating system boot data at NVRAM 122 can lead to faster boot time for device 101 due to the often faster data retrieval speeds of such devices, as compared to eMMC devices. In some implementations, NVRAM 122 can store operating system boot data, and processor 114 can be further configured to: retrieve the operating system boot data from NVRAM 122 when processor 110 requests the operating system boot data from eMMC 112 via client eMMC interface 116, for example at a boot and/or startup of device 101. Such implementations are described in further detail below with respect to FIG. 12.

Method 200 will now be illustrated with reference to FIGS. 3 to 5, each of which is substantially similar to FIG. 1, with like elements having like numbers.

Figure 3:
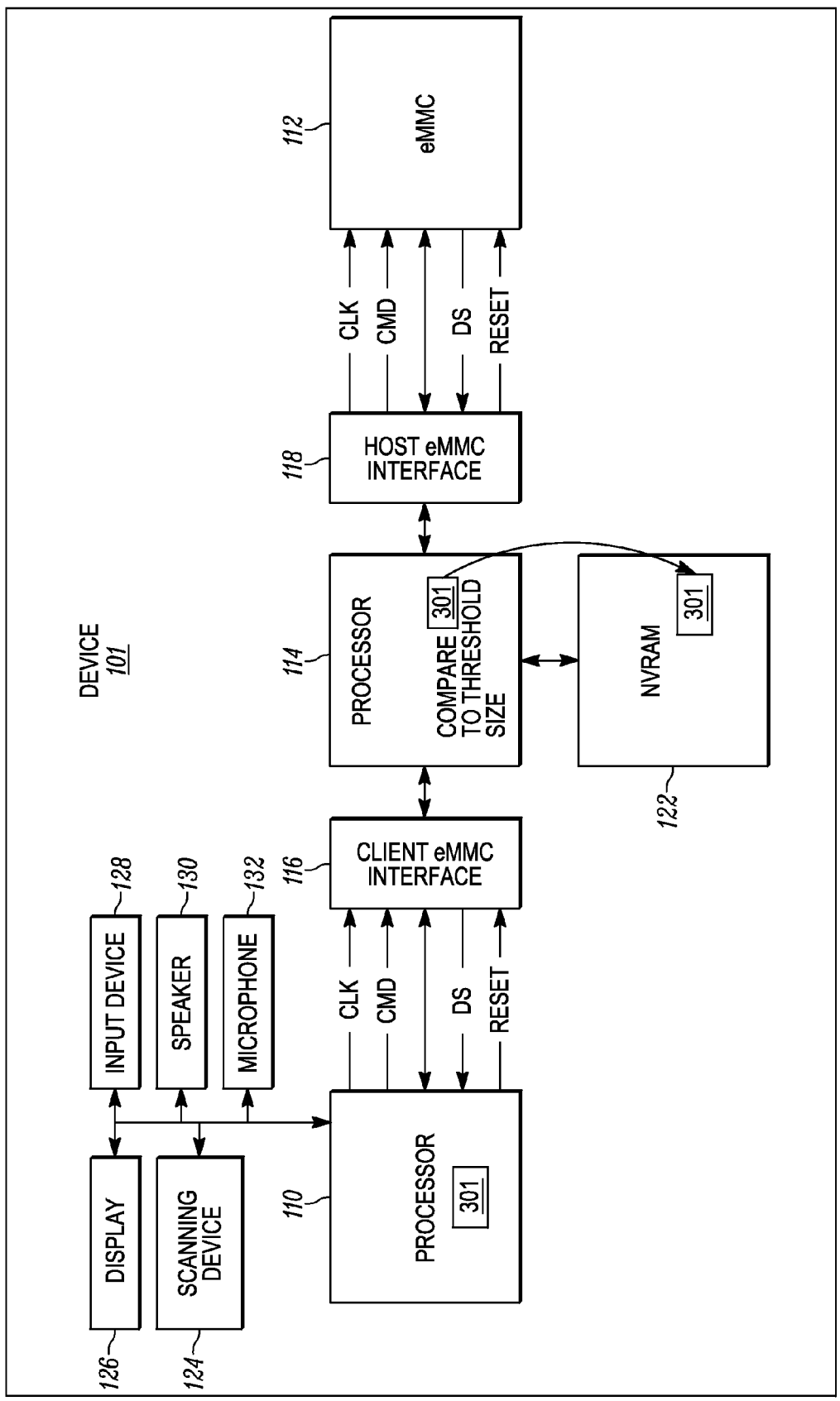
FIG. 3 depicts the device of FIG. 1 at least temporarily storing data at an NVRAM in accordance with some embodiments.

Attention is hence next directed to FIG. 3 in which processor 110 has received data 301 from, for example, one or more of scanning device 124, input device 128, a communication interface and the like. Indeed, the source of data 301 is generally non-limiting. Processor 110 then attempts to store data 301 to eMMC 112 by transmitting data 301 via client eMMC interface 116; indeed, processor 110 is generally configured to store data 301 to an eMMC device but as client eMMC interface 116 interfaces with processor 114, data 301 is intercepted at processor 114 rather than being stored to eMMC 112. In other words, processor 114 receives data 301 from processor 110 via client eMMC interface 116 (i.e. block 201 of method 200).

As also depicted in FIG. 3, processor 114 compares a size of data 301 to a threshold size (i.e. block 203 of method 200) and, when the size of data 301 is less than the threshold size, data 301 is at least temporarily stored at NVRAM 122 (i.e. block 207 of method 200); in FIG. 3, it is assumed that data 301 is less than the threshold size.

Figure 4:
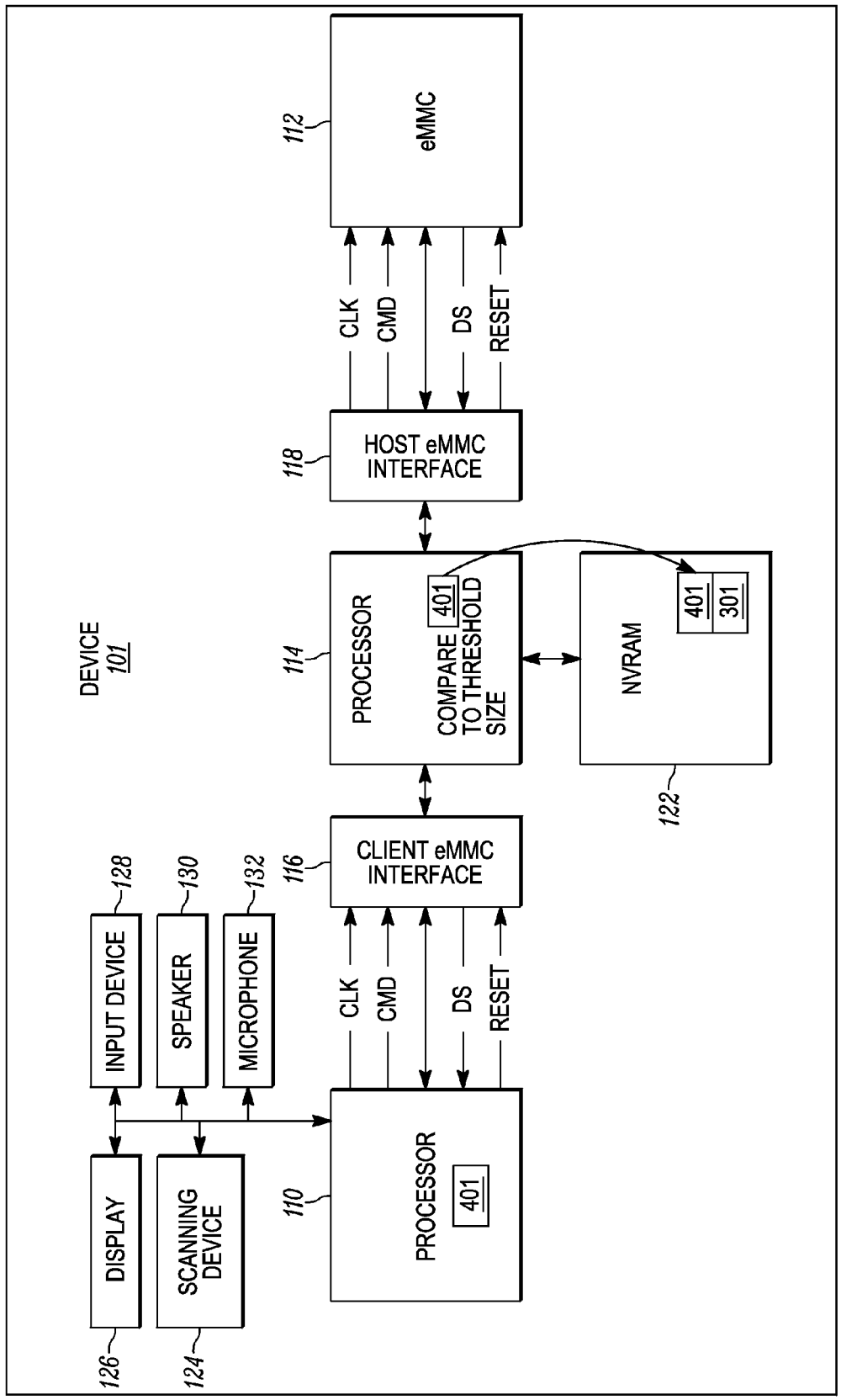
FIG. 4 depicts the device of FIG. 1 aggregating data at the NVRAM in accordance with some embodiments.

Attention is next directed to FIG. 4, which depicts processor 110 receiving further data 401. As in FIG. 3, processor 114 receives data 401 from processor 110 via client eMMC interface 116 (i.e. block 201 of method 200), compares data 401 to the threshold size (i.e. block 203 of method 200) and, when the size of data 401 is less than the threshold size, data 401 is at least temporarily stored at NVRAM 122 (i.e. block 207 of method 200), and aggregated with data 301. Aggregation of with data 301 can include, but is not limited to, storing data 301, 401 in association with each other, though each set of data 301, 401 can be indexed separately. Indeed, associations between data 301, 401 can include associating their indices. In yet further implementations, data 401 can be appended to data 301, though separately indexed.

Figure 5:
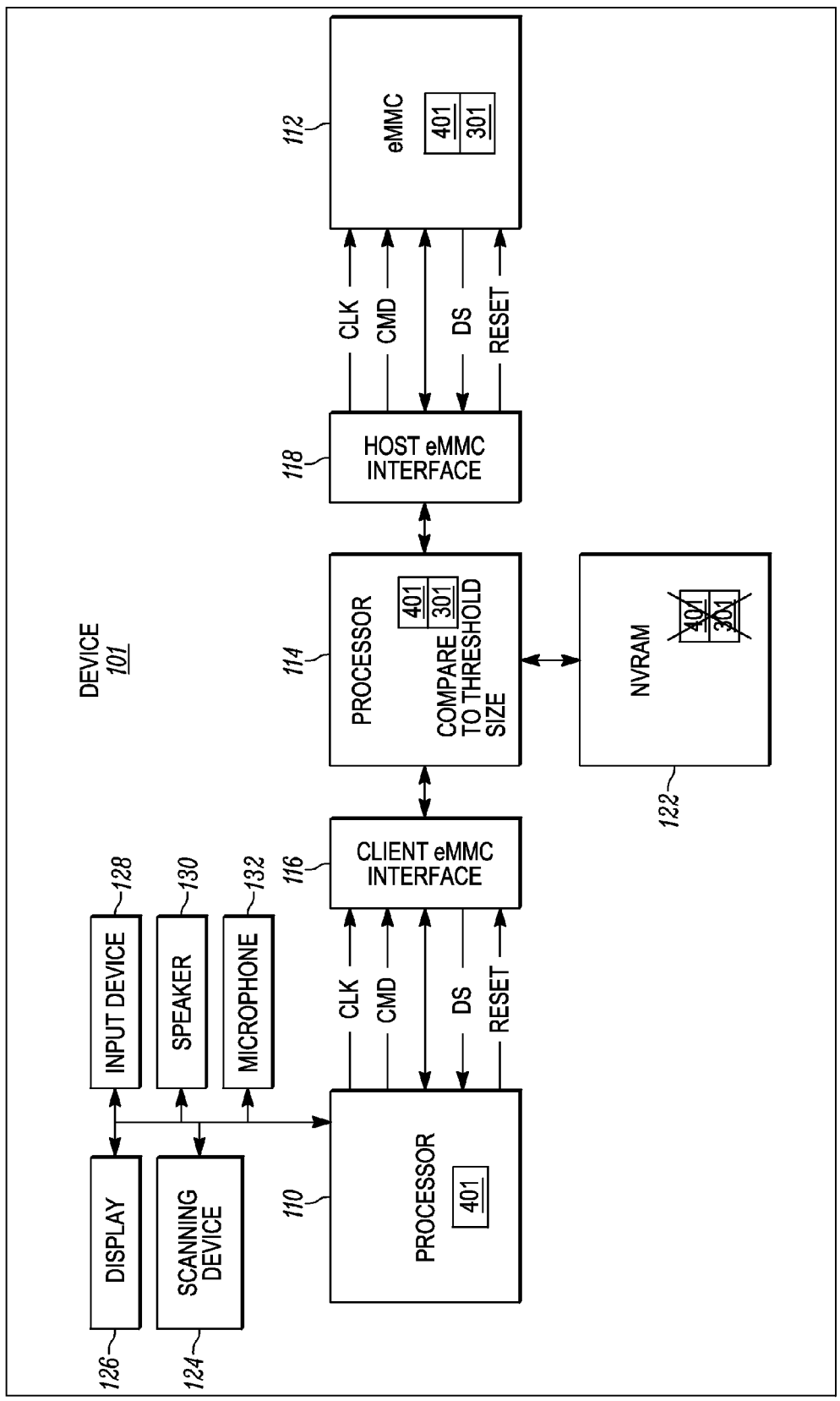
FIG. 5 depicts the device of FIG. 1 moving aggregated data from the NVRAM to the eMMC in accordance with some embodiments.

Attention is next directed to FIG. 5, which depicts processor 114 comparing a size of aggregated data 301, 401 with the threshold size (i.e. block 209 of method 200). When the size of size of aggregated data 301, 401 is greater than or equal the threshold size, aggregated data 301, 401 is moved to eMMC 112 via host eMMC interface 118 (i.e. block 211 of method 200). In other words, as depicted, aggregated data 301, 401 is copied to eMMC 112 and deleted from NVRAM 122.

Hence, aggregated data 301, 401 is stored to eMMC 112 in one write cycle rather than two write cycles. When method 200 is implemented repeatedly at processor 114 so that data that is smaller than the threshold size is aggregated at NVRAM 122 before being moved to eMMC 112, the number of write cycles at eMMC 112 can be reduced significantly. Hence, in present implementations, eMMC 112 is not partitioned in a pseudo-SLC mode; for example, a storage size of eMMC 112 that is accessible to processors 110, 114 is similar to an actual storage size of eMMC 112.

Indeed, present implementations can alternatively be referred to as a virtualization of a multilevel cell ("MLC") eMMC, and in particular virtualization of MLC NAND eMMC using NVRAM such as mRAM, pcRAM, rRAM and the like, which can enhance durability and/or performance of an eMMC. Similarly, read wear and write disturb issues that plague small process geometry NAND eMMC flash memories can be addressed by buffering and caching writes and reads in an intermediary buffer (i.e. NVRAM 122).

Figure 6:
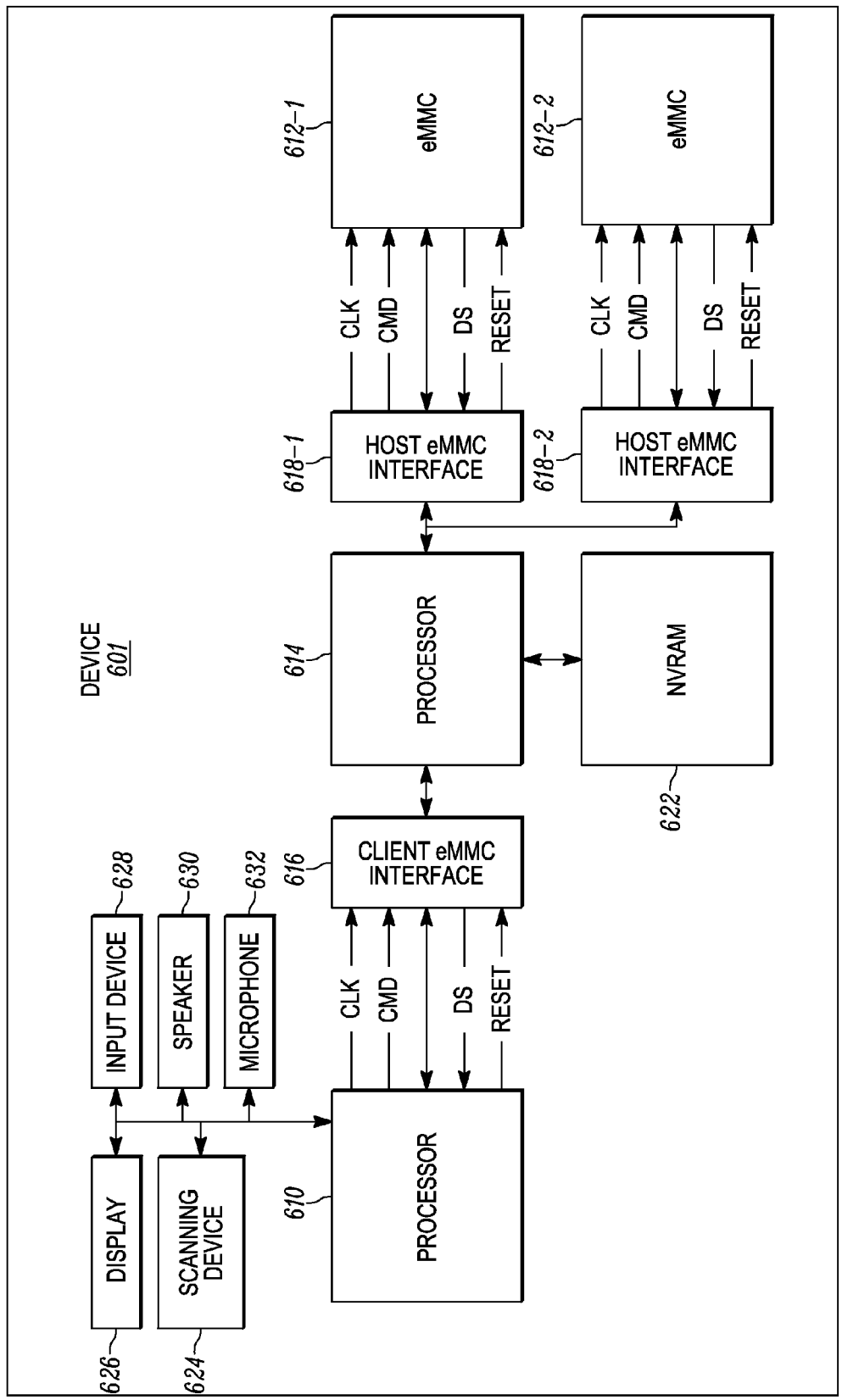
FIG. 6 is a block diagram of an alternative device with enhanced eMMC functionality, in accordance with some embodiments.

In some implementations, device 101 can be modified to include at least a second eMMC. For example, attention is next directed to FIG. 6, which depicts an alternative implementation of a device 601, and which is hence substantially similar to FIG. 1, with like elements having like numbers, however preceded by a "6" rather than a "1". Hence, device 601 comprises: a first processor 610; a first multimedia card memory ("eMMC") 612-1; a second eMMC 612-2; a second processor 614; a client eMMC interface 616 between second processor 614 and first processor 610; a first host eMMC interface 618-1 between second processor 614 and first eMMC 612-1; a second host eMMC interface 618-2 between second processor 614 and second eMMC 612-2; and an NVRAM ("Non-Volatile Random Access Memory") 610 in communication with second processor 614, second processor 614 configured to manage data storage to eMMC 612-1, eMMC 612-2 and NVRAM 622 so that eMMC 612-1, eMMC 612-2 and NVRAM 622 appears as a single storage device to first processor 610.

For example, as with processor 114 of device 101, at device 601, processor 614 is further configured to at least temporarily store data received from first processor 610 via client eMMC interface 616 at NVRAM 622 prior to storing the data at one of first eMMC 612-1 and second eMMC 612-2, so that first eMMC 612-1, second eMMC 612-2 and NVRAM 622 appears as the single storage device to first processor 610.

Indeed, method 200 can be implemented at processor 614 however processor 614 can be further configured, at blocks 205, 211, to determine which of first eMMC 612-1, second eMMC 612-2 is to be used to store data and/or aggregated data. Such a determination can be made based on, for example, a storage balancing algorithm and/or a write cycle algorithm that attempts to balance amounts of respective data stored at each of first eMMC 612-1 and second eMMC 612-2 and/or attempts to balance write cycles to each of first eMMC 612-1 and second eMMC 612-2. However, other factors and/or algorithms and the like can be used by processor 114 to determine which of first eMMC 612-1 and second eMMC 612-2 is to be used to store data and/or aggregated data.

Furthermore, while only two MMCs 612-1, 612-2, and two host eMMC interfaces 618-1, 618-2 are depicted, in yet further implementations, device 601 can be adapted to include more than two MMCs, as well as associated host eMMC interfaces.

It is noted that, as in device 101, device 601 further comprises optional scanning device 624, display 626, input device 628, speaker 630, and microphone 632, an optionally a communication interface.

Figure 7:
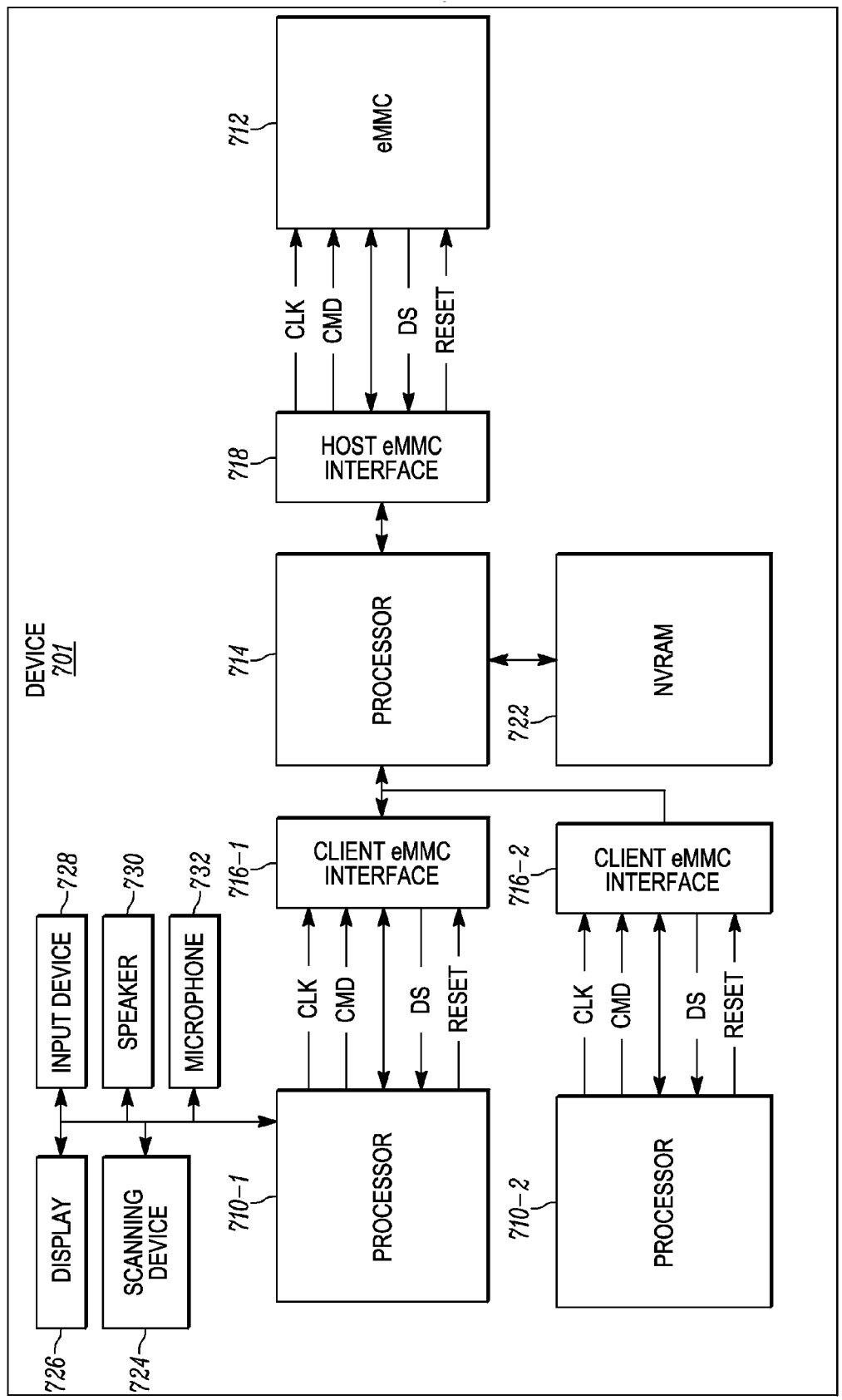
FIG. 7 is a block diagram of an alternative device with enhanced eMMC functionality, in accordance with some embodiments.

In some implementations, device 101 (and/or device 601) can be modified to include at least a third processor and/or a second host application processor. For example, attention is next directed to FIG. 7, which depicts an alternative implementation of a device 701, and which is hence substantially similar to FIG. 1, with like elements having like numbers, however preceded by a "7" rather than a "1". Hence, device 701 comprises: a first processor 710-1; a multimedia card memory ("eMMC") 712; a second processor 714; a first client eMMC interface 716-1 between second processor 714 and first processor 710-1; a third processor 710-2; a second client eMMC interface 716-2 between second processor 714 and second processor 710-2; a host eMMC interface 718 between second processor 714 and eMMC 712; and an NVRAM ("Non-Volatile Random Access Memory") 710 in communication with second processor 714, second processor 714 configured to manage data storage to eMMC 712 and NVRAM 710 so that eMMC 712 and NVRAM 710 appears as a single storage device to first processor 710-1 and third processor 710-2.

For example, as with processor 114 of device 101, at device 701, processor 714 is further configured to: receive respective data from first processor 710-1 and third processor 710-2, for storage at eMMC 712 memory via, respectively, first client eMMC interface 716-1 and second client eMMC interface 716-2; and, at least temporarily store the respective data at NVRAM 722. In other words, method 200 can be implemented at processor 714 but with data received from both of processors 710-1, 710-2 via respective client eMMC interfaces 716-1, 716-2.

Furthermore, while only two processors 710-1, 710-2, and two client eMMC interfaces 716-1, 716-2 are depicted, in yet further implementations, device 701 can be adapted to include more than two processors 710-1, 710-2, as well as associated client eMMC interfaces. In particular, each of processors 710-1, 710-2 can comprise a host application processor, and device 701 can be adapted to include more than two host application processors which processes data for different applications running at device 701 and/or processes the same application in parallel.

It is noted that, as in device 101, device 701 further comprises optional scanning device 724, display 726, input device 728, speaker 730, and microphone 732, an optionally a communication interface.

In some implementations, device 101 (and/or device 601 and/or device 701) can be modified to include at least a slave host processor. For example, attention is next directed to FIG. 8, which depicts an alternative implementation of a device 801, and which is hence substantially similar to FIG. 1, with like elements having like numbers, however preceded by an "8" rather than a "1". Hence, device 801 comprises: a first processor 810-1; a multimedia card memory ("eMMC") 812; a second processor 814; a first client eMMC interface 816-1 between second processor 814 and first processor 810-1; a third processor 810-2; a second client eMMC interface 816-2 between second processor 814 and second processor 810-2; each of first client eMMC interface 816-2 and second client eMMC interface 816-2 comprising a respective interrupt line 890-1, 890-2 between processor 814 and a respective one of first processor 810-2 and third processor 810-2; a host eMMC interface 818 between second processor 814 and eMMC 812; and an NVRAM ("Non-Volatile Random Access Memory") 810 in communication with second processor 814, second processor 814 configured to manage data storage to eMMC 812 and NVRAM 822 so that eMMC 812 and NVRAM 822 appears as a single storage device to first processor 810-1 and third processor 810-2. Indeed, device 801 can function similar to device 701 and method 200 can hence be implemented at processor 814 as described above. In particular, in these implementations, at least client eMMC interface 816-2 can comprise an SD interface and/or an SDIO interface, so that processor 810-1 can establish a high throughput digital interface with processor 810-2, in which client eMMC interface 816-1 can comprises an eMMC interface and client eMMC interface 816-2 can include an SD interface and/or an SDIO interface.

Furthermore, while only two processors 810-1, 810-2, and two client eMMC interfaces 816-1, 816-2 are depicted, in yet further implementations, device 801 can be adapted to include more than two processors 810-1, 810-2, as well as associated client eMMC interfaces. In particular, each of processors 810-1, 810-2 can comprise a host application processor, and device 801 can be adapted to include more than two host application processors which processes data for different applications running at device 801 and/or processes the same application in parallel.

It is noted that, as in device 101, device 801 further comprises optional scanning device 824, display 826, input device 828, speaker 830, and microphone 832, an optionally a communication interface.

However, in these implementations, processor 810-2 can comprise a slave host processor, which operates, for example, as a slave to processor 810-1. For example, processor 810-2 can process data for applications being processed at processor 810-1, which can be exchanged between processor 810-1, 810-2 as described hereafter.

In particular, processor 814 can be further configured to: receive respective data from processor 810-1 via, client eMMC interface 816-1; store the data at NVRAM 822; and transmit a message to processor 810-2 on second client eMMC interface 816-2, via the respective interrupt line 890-1, to retrieve the data. Processor 810-2 can then retrieve the data by requesting the data from NVRAM 822 via client eMMC interface 816-2 and processor 814. Data can be passed from processor 810-2 to processor 810-1 in a similar manner using interrupt line 890-1 to signal processor 810-1 to retrieve data from NVRAM 822 posted by processor 810-2.

In other words, in these implementations, NVRAM 822 can comprise a temporary storage for exchanging data between first processor 810-1 and third processor 810-2, and a respective interrupt line 890-1, 890-2 of each of first client eMMC interface 816-1 and second client eMMC interface 816-2 comprises a path for signaling each of first processor 810-1 and third processor 810-2 to retrieve the data stored therein received from the other of first processor 810-1 and third processor 810-1 via a respective client eMMC interface 816-1, 816-2.

It is appreciated that each of interrupt lines 890-1, 890-2 can comprise a respective software construction and/or signaling format, for example implemented on a respective data bus, and need not be a hardware line and/or a dedicated hardware line. However, in other implementations, one or more of interrupt lines 890-1, 890-2 can comprise a hardware line. In particular, each of interrupt lines 890-1, 890-2 can comprise an off-band signaling and/or additional signaling (e.g. on a data bus) which is outside of standard specifications for eMMC interfaces and/or SD interfaces and/or SDIO interfaces.

Figure 8:
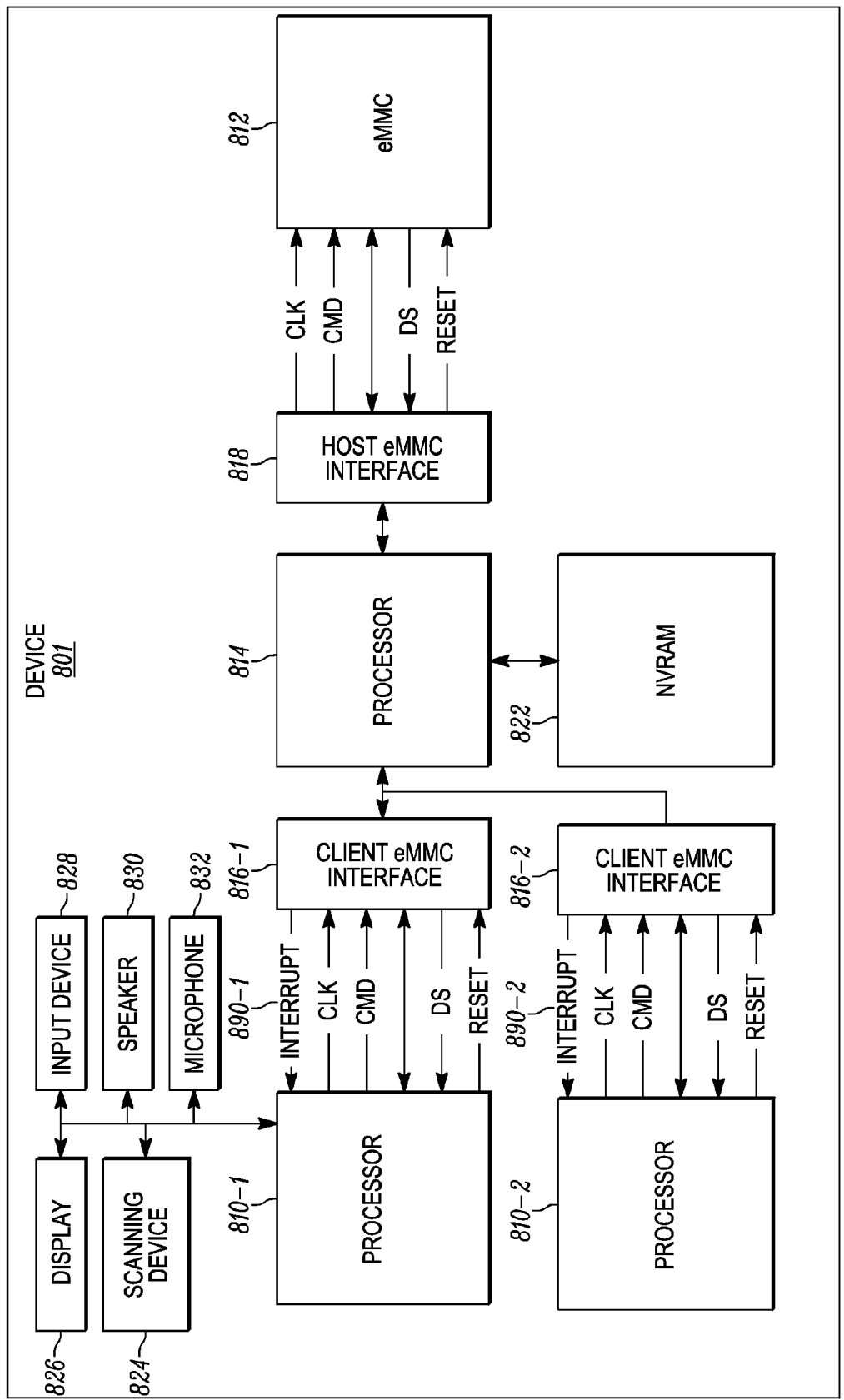
FIG. 8 is a block diagram of an alternative device with enhanced eMMC functionality, in accordance with some embodiments.

Operation of device 801 is now described with reference to FIGS. 9 to 11, each of which is substantially similar to FIG. 8, with like elements having like numbers.

Figure 9:
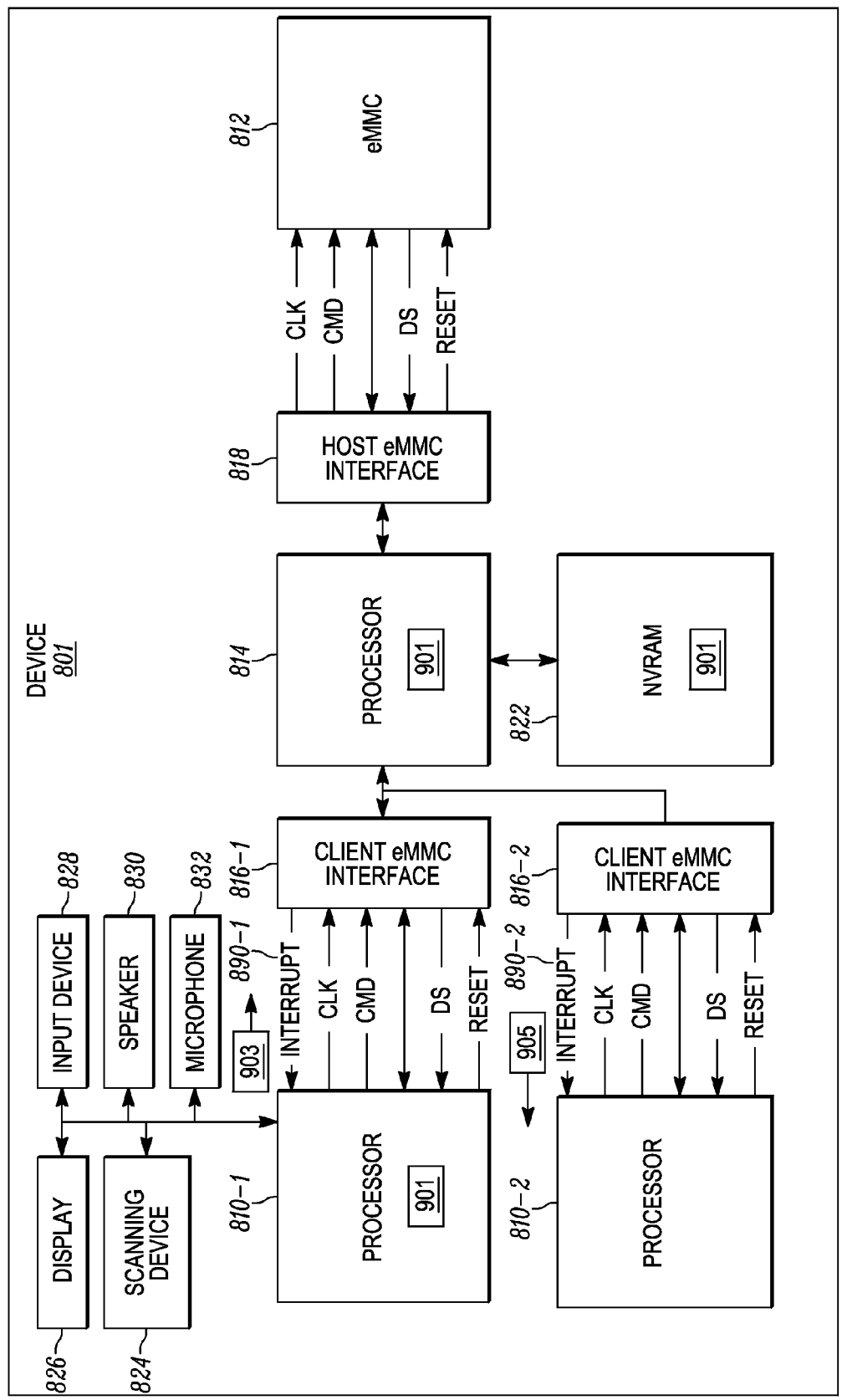
FIG. 9 depicts the device of FIG. 8 temporarily storing data from a first processor at an NVRAM in accordance with some embodiments.

In FIG. 9, data 901 has been received and/or generated at processor 810-1 as described above, transmitted to processor 814 via client eMMC interface 816-1, and at least temporarily stored at NVRAM 822. In association with transmitting data 901 to processor 814, processor 810 can signal processor 814 that data 901 is to be processed by processor 810-2, for example with processor 810-1 operating in a slave mode to processor 810-1. Such signaling can occur using interrupt line 890-1, for example by transmitting a message 903 using interrupt line 890-1. Message 903 can comprise an indicator that data 901 is to be processed by processor 810-2. Processor 814 hence, transmits a message 905 using interrupt line 890-2 to retrieve and process data 901 from NVRAM 822.

Figure 10:
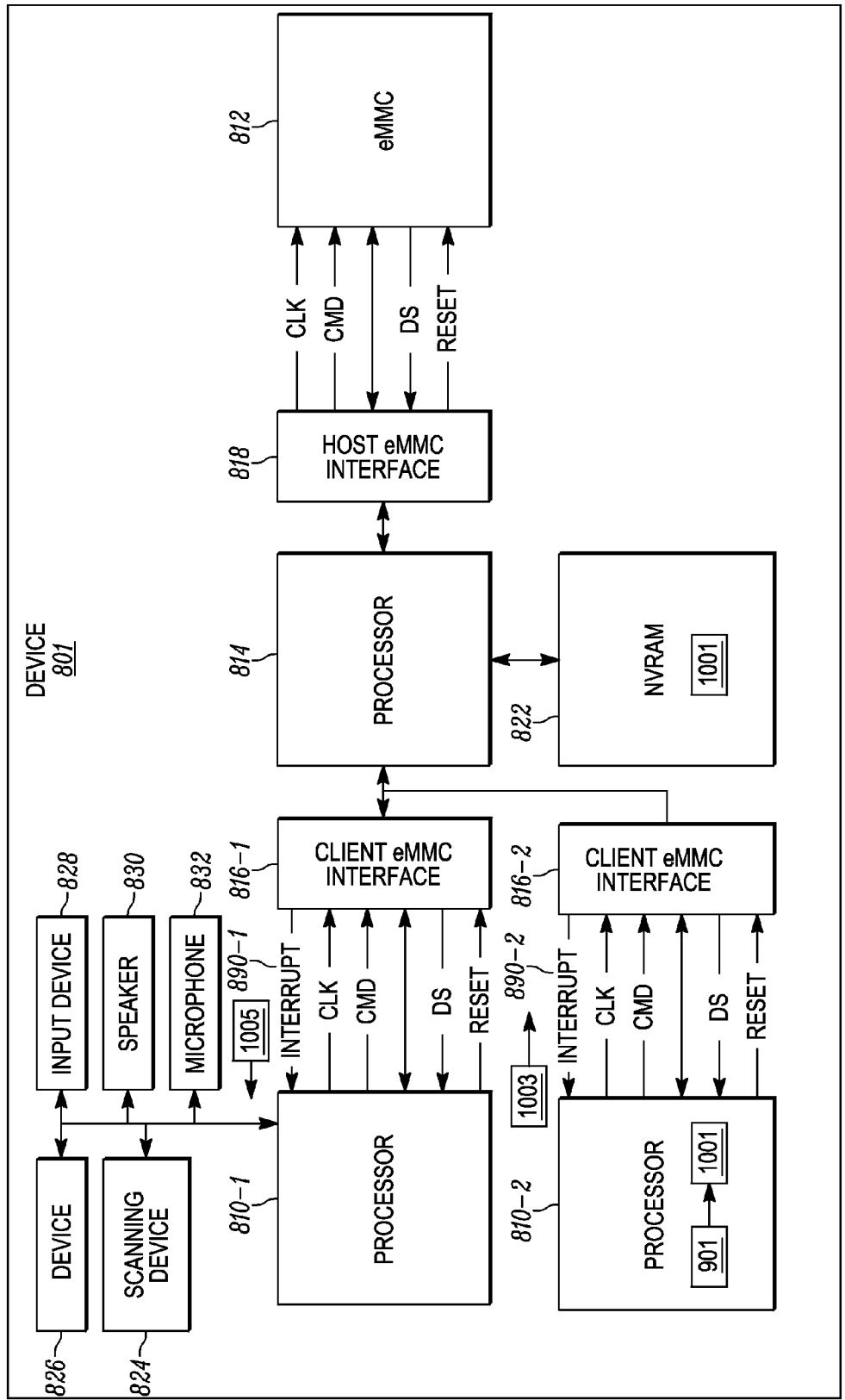
FIG. 10 depicts the device of FIG. 8 in which a slave processor retrieves the data from the NVRAM using interrupt line signaling in accordance with some embodiments.
Figure 11:
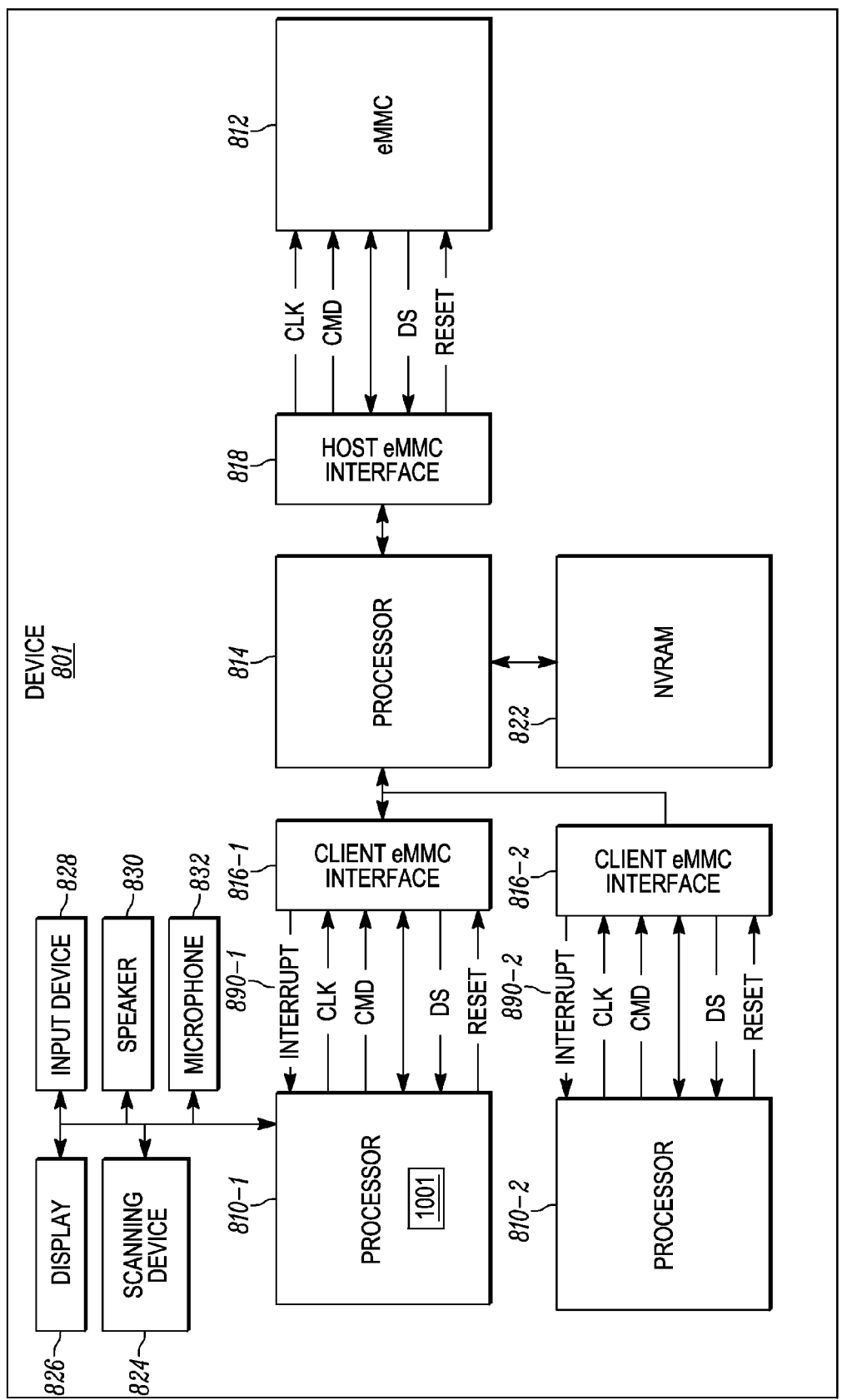
FIG. 11 depicts the device of FIG. 8 in which the first processor retrieves data stored at the NVRAM by the slave processor using interrupt line signaling in accordance with some embodiments.

In FIG. 10, processor 810-2 has processed message 905 and, in response retrieved data 901 from NVRAM 822 using client eMMC interface 816-2. Data 901 can subsequently be deleted at NVRAM 822. Processor 810-2 has further processed data 901 and generated processed data 1001. Processor 810-2 can then pass data 1001 to processor 810-2 using the reverse procedure. For example, processor 810-2 can transmit data 1001 to processor 814 using client eMMC interface 816-2, so that data 1001 is at least temporarily stored at NVRAM 822, and further signal processor 814, using a message 1003 transmitted using interrupt line 890-1, that data 1001 is to be retrieved by processor 810-1. Processor 814 signals processor 810-1 using a message 1005 transmitted using interrupt line 890-1 that data 1001 is be retrieved. In FIG. 11, processor 810-1 has responsively retrieved data 1001 from NVRAM 822, and data 1001 has been deleted from NVRAM 822

In each scenario described with reference to FIGS. 9 to 11, each of processors 810-1, 810-2 behave as if communicating with eMMC 812 and not processor 814. Rather, processor 814, in combination with client eMMC interfaces 816-1, 816-2, mimics the behavior of an eMMC device, with the addition of interrupt lines 890-1, 890-2.

Figure 12:
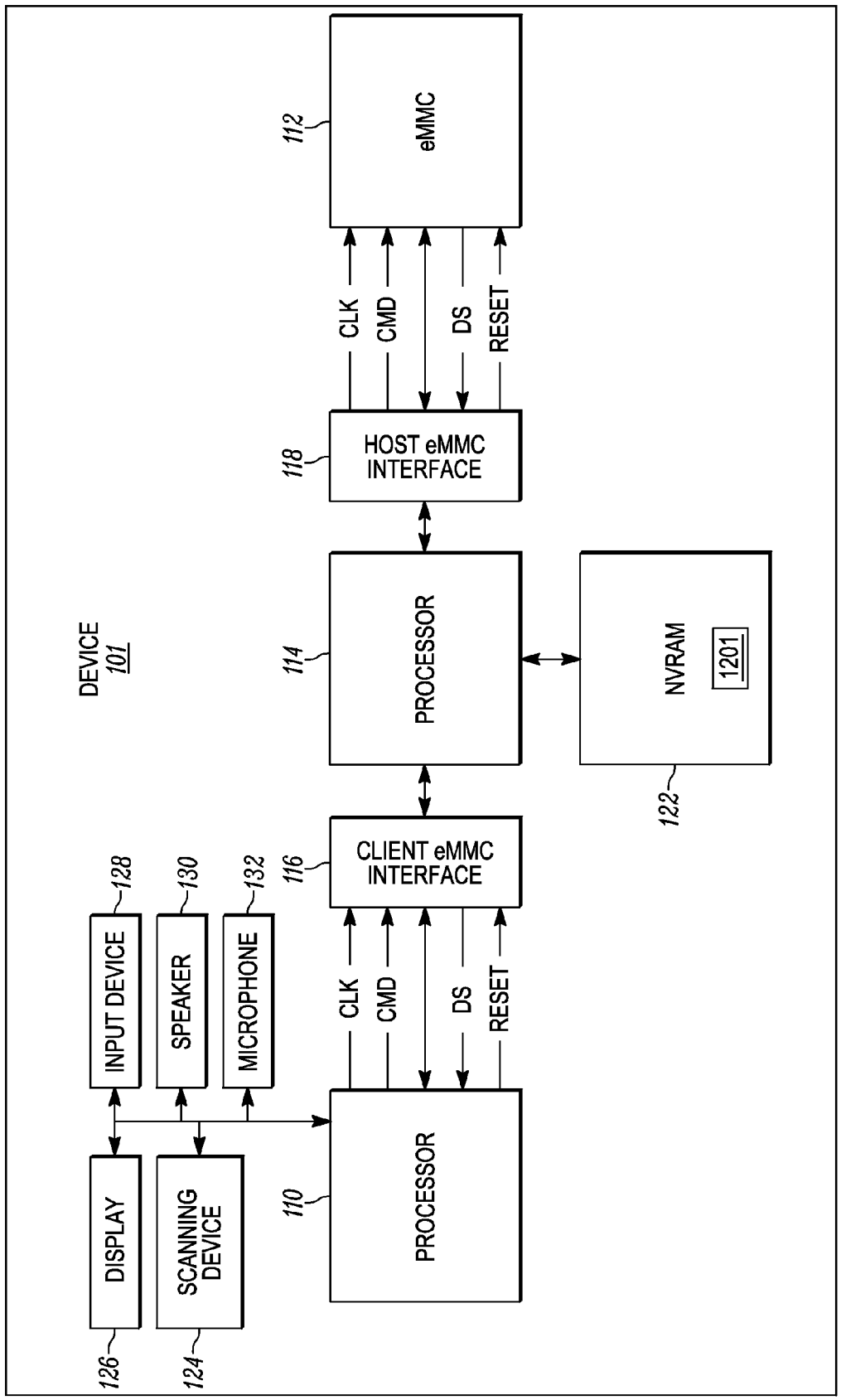
FIG. 12 depicts the device of FIG. 1 in which the processor retrieves one or more of system critical data, boot data, and operating system data stored at the NVRAM, for example in an instant-on scenario, in accordance with some embodiments.

Attention is next directed to FIG. 12, which is substantially similar to FIG. 1 with like elements having like numbers. However, in FIG. 12 NVRAM 122 stores data 1201 comprising one or more of operating system boot data, boot data, operating system data, and system critical data. For example, data 1201 can be stored at NVRAM 122 in a provisioning process and/or when processor 110 attempts to store data 1201 at eMMC 112, processor 114 can be configured to intercept data 1201 and store at NVRAM 122 instead of eMMC 112. Furthermore, data 1201 can be updated in a similar manner; for example, processor 110 can attempt to update boot data which appears to processor 110 as if stored at eMMC 112, and processor 114 can be configured to intercept such updates and update data 1201 at NVRAM 122 instead. In other words, in present implementations, operating system boot data, boot data, operating system data, and system critical data can be stored at NVRAM 122 rather than eMMC 112, as NVRAM 122 tends to have higher and/or faster data throughput than eMMC 112. Hence, processor 114 can be further configured to: retrieve one or more of the operating system boot data, the boot data, the operating system data, and the system critical data from the NVRAM when processor 110 requests one or more of the operating system boot data, the boot data, the operating system data, and the system critical data from the eMMC 112 via client eMMC interface 116. In other words, when processor 110 requests data 1201 from eMMC 112 via client eMMC interface 116, processor 114 intercepts the request, retrieves data 1201 from NVRAM 122 (rather than eMMC 112) and sends to processor 110 via client eMMC interface 116. Such a process can be used to provide an "instant-on" feature in device 101; in other words, storing data 1201 at NVRAM 122, rather than eMMC 112, can lead to faster boot times for device 101 due to the faster data throughput of NVRAM 122.

It is further noted that data 1201 is maintained in NVRAM 122 in addition to any data being aggregated at NVRAM 122 as described above with respect to method 200. In other words, data 1201 is not incorporated into the aggregated data (e.g. data 301, 401) being at least temporarily stored at NVRAM 122 before movement to eMMC 112.

Hence, described herein is a device with expanded eMMC functionality, and indeed, the components located between a host application processor (and the like), such as processor 110, and the like, and an eMMC device, such as eMMC 112, and the like, can be referred to an eMMC functionality expander, including the additional processor, the NVRAM, the client eMMC interface and the host eMMC interface, as well as any additional eMMC interfaces for interfacing with additional application processors, and the like, and/or for interfacing with additional eMMC devices. Such expanded functionality includes memory virtualization, and use of memory virtualization as a data pass through between a host application processor and a slave application processor.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A device comprising:
   a first processor;
   a multimedia card memory ("eMMC");
   a second processor;
   a client eMMC interface between the second processor and the first processor;
   a host eMMC interface between the second processor and the eMMC;
   an NVRAM ("Non-Volatile Random Access Memory") in communication with the second processor, the second processor configured to manage data storage to the eMMC and the NVRAM so that the eMMC and the NVRAM appears as a single storage device to the first processor;
   a third processor; and
   a second client eMMC interface between the second processor and the third processor, each of the client eMMC interface and the second client eMMC interface comprising a respective interrupt line between the second processor and a respective one of the first processor and the third processor, the second processor further configured to:
   receive data from the first processor via, the client eMMC interface,
   store the respective data at the NVRAM, and
   transmit a message to the third processor on the second client eMMC interface, via the respective interrupt line, to retrieve the data.

2. The device of claim 1, wherein the NVRAM comprises one or more of: a magnetic RAM, a phase change memory and a resistive RAM.

3. The device of claim 1, wherein the second processor is further configured to: receive data from the first processor for storage at the eMMC via the client eMMC interface; and, at least temporarily store the data at the NVRAM.

4. The device of claim 1, wherein the second processor is further configured to: aggregate data received from the first processor, via the client eMMC interface, for storage at the eMMC, at the NVRAM, when a size of the data is below a threshold size; and, when aggregated data is above the threshold size, move the aggregated data to the eMMC.

5. The device of claim 4, wherein the threshold size is one or more of a Nand page size and maximum page size of the NVRAM.

6. The device of claim 1, wherein the NVRAM stores one or more of operating system boot data, boot data, operating system data, and system critical data, and the second processor is further configured to: retrieve one or more of the operating system boot data, the boot data, the operating system data, and the system critical data from the NVRAM when the first processor requests one or more of the operating system boot data, the boot data, the operating system data, and the system critical data from the eMMC via the client eMMC interface.

7. The device of claim 1, wherein the NVRAM comprises a temporary storage for exchanging data between the first processor and the third processor, and the respective interrupt line of each of the client eMMC interface and the second client eMMC interface comprising a path for signaling each of the first processor and the third processor to retrieve the data stored therein received by an other of the first processor and the third processor via a respective client eMMC interface.

8. The device of claim 1, further comprising a second eMMC and a second host eMMC interface between the second processor and the second eMMC.

9. The device of claim 8, the second processor further configured to at least temporarily store data received from the first processor via the client eMMC interface at the NVRAM prior to storing the data at one of the eMMC and the second eMMC, so that the eMMC, the second eMMC and the NVRAM appears as the single storage device to the first processor.

10. The device of claim 1, wherein the second processor, the client eMMC interface and the host eMMC interface comprises a module within the device.

11. The device of claim 1, wherein the second processor, the client eMMC interface and the host eMMC interface comprises a field programmable gate device ("FPGA").

12. A method comprising:
    aggregating data received from a first processor, via a client eMMC ("multimedia card memory") interface, for storage at an eMMC, at an NVRAM ("Non-Volatile Random Access Memory"), when a size of the data is below a threshold size, aggregation occurring using a second processor of a device comprising: the first processor; the eMMC; the second processor; the client eMMC interface between the second processor and the first processor; a host eMMC interface between the second processor and the eMMC; and the NVRAM in communication with the second processor;
    when aggregated data is above the threshold size, moving, using the second processor, the aggregated data to the eMMC;
    receiving, at the second processor, further data from the first processor;
    storing, using the second processor, the further data at the NVRAM; and
    transmitting the further data to a slave processor when signals on at least one interrupt line are received from one or more of the first processor and the slave processor.

13. The method of claim 12, wherein the threshold size is one or more of a Nand page size and maximum page size of the NVRAM.

14. The method of claim 12, further comprising: receiving, at the second processor, the data from the first processor for storage at the eMMC via the client eMMC interface; and, at least temporarily storing, using the second processor, the data at the NVRAM.

15. A computer program product, comprising a non-transitory computer usable medium having a computer readable program code adapted to be executed to implement a method comprising:
    aggregating data received from a first processor, via a client eMMC ("multimedia card memory") interface, for storage at an eMMC, at an NVRAM ("Non-Volatile Random Access Memory"), when a size of the data is below a threshold size, aggregation occurring using a second processor of a device comprising: the first processor; the eMMC; the second processor; the client eMMC interface between the second processor and the first processor; a host eMMC interface between the second processor and the eMMC; and the NVRAM in communication with the second processor;
    when aggregated data is above the threshold size, moving, using the second processor, the aggregated data to the eMMC;
    receiving, at the second processor, further data from the first processor;
    storing, using the second processor, the further data at the NVRAM; and transmitting the further data to a slave processor when signals on at least one interrupt line are received from one or more of the first processor and the slave processor.

16. The computer program product of claim 15, wherein the threshold size is one or more of a Nand page size and maximum page size of the NVRAM.

* * * * *